(12) United States Patent
Kurjanowicz et al.

(10) Patent No.: US 10,839,330 B2
(45) Date of Patent: Nov. 17, 2020

(54) ACHIEVEMENT PORTFOLIO SYSTEM

(71) Applicant: ADP, LLC, Roseland, NJ (US)

(72) Inventors: Agatha Kurjanowicz, Ottawa (CA);
Scott Crockett, New York, NY (US);
Sirui Liu, New York, NY (US); Jesse S. Zolna, Larchmont, NY (US);
Michael Thibodeau, Brooklyn, NY (US); Valérie Felger, Fort-de-France (MQ); David Philander Derby, New York, NY (US); Jerome Gouvernel, Brooklyn, NY (US)

(73) Assignee: ADP, LLC, Roseland, NJ (US)

( * ) Notice: Subject to any disclaimer, the term of this patent is extended or adjusted under 35 U.S.C. 154(b) by 897 days.

(21) Appl. No.: 15/054,769

(22) Filed: Feb. 26, 2016

(65) Prior Publication Data

US 2017/0103354 A1    Apr. 13, 2017

Related U.S. Application Data

(60) Provisional application No. 62/240,682, filed on Oct. 13, 2015.

(51) Int. Cl.
| | |
|---|---|
| *G06Q 10/00* | (2012.01) |
| *G06Q 10/06* | (2012.01) |
| *H04L 29/08* | (2006.01) |
| *G06Q 10/10* | (2012.01) |
| *G06Q 50/00* | (2012.01) |

(52) U.S. Cl.
CPC ..... *G06Q 10/0639* (2013.01); *G06Q 10/1053* (2013.01); *H04L 67/306* (2013.01); *G06Q 50/01* (2013.01)

(58) Field of Classification Search
None
See application file for complete search history.

(56) References Cited

U.S. PATENT DOCUMENTS

| | | |
|---|---|---|
| 6,735,570 B1 | 5/2004 | Lacy et al. |
| 7,310,625 B2 | 12/2007 | Wu |
| 7,444,315 B2 | 10/2008 | Wu |

(Continued)

FOREIGN PATENT DOCUMENTS

WO    WO2013149198 A1    10/2013

OTHER PUBLICATIONS

Kurjanowicz et al., "Viral Workstream System," U.S. Appl. No. 15/054,679, filed Feb. 26, 2016, 58 pages.

(Continued)

*Primary Examiner* — Gurkanwaljit Singh
(74) *Attorney, Agent, or Firm* — Yee & Associates, P.C.

(57) ABSTRACT

A computer system comprises a display system and a portfolio builder in communication with the display system. The portfolio builder identifies activities of an employee. In response to identifying the activities, the portfolio builder identifies achievements of the employee from the activities. Further, the portfolio builder identifies recommended achievements from the achievements based on the application of one or more rules in a policy. Still further, the portfolio builder associates the recommended achievements with an achievement portfolio of the employee, enabling performing an operation for the organization based on the skills for the people in the organization.

18 Claims, 8 Drawing Sheets

(56) References Cited

U.S. PATENT DOCUMENTS

| | | | |
|---|---|---|---|
| 7,805,381 B2* | 9/2010 | Habichler | G06Q 10/06398 |
| | | | 705/320 |
| 8,046,307 B2 | 10/2011 | Habichler et al. | |
| 8,086,482 B2* | 12/2011 | Silvera | G06Q 10/00 |
| | | | 705/7.38 |
| 8,204,809 B1* | 6/2012 | Wise | G06Q 40/06 |
| | | | 705/35 |
| 8,306,839 B2 | 11/2012 | Deich et al. | |
| 8,311,863 B1* | 11/2012 | Kemp | G06Q 10/0639 |
| | | | 705/7.11 |
| 2003/0182173 A1 | 9/2003 | D'Elena et al. | |
| 2003/0182178 A1 | 9/2003 | D'Elena et al. | |
| 2003/0229529 A1 | 12/2003 | Mui et al. | |
| 2004/0030566 A1 | 2/2004 | Brooks | |
| 2005/0015291 A1* | 1/2005 | O'Connor | G06Q 10/10 |
| | | | 434/219 |
| 2007/0202475 A1* | 8/2007 | Habichler | G06Q 10/06 |
| | | | 434/219 |
| 2007/0203711 A1 | 8/2007 | Nation et al. | |
| 2007/0208575 A1* | 9/2007 | Habichler | G06Q 10/06398 |
| | | | 705/7.42 |
| 2008/0040206 A1* | 2/2008 | Silvera | G06Q 10/00 |
| | | | 705/7.42 |
| 2008/0071610 A1 | 3/2008 | Dhillon et al. | |
| 2009/0138342 A1* | 5/2009 | Otto | G06N 5/025 |
| | | | 706/45 |
| 2009/0286217 A1 | 11/2009 | Kobayashi | |
| 2009/0319316 A1 | 12/2009 | Westerfeld et al. | |
| 2010/0070883 A1 | 3/2010 | Hamilton, II et al. | |
| 2011/0136092 A1 | 6/2011 | Murray | |
| 2011/0161139 A1 | 6/2011 | Maheshwari et al. | |
| 2011/0289443 A1 | 11/2011 | Heaven et al. | |
| 2011/0307285 A1 | 12/2011 | Kale et al. | |
| 2012/0011239 A1 | 1/2012 | Svane et al. | |
| 2013/0217501 A1 | 8/2013 | Bruno, Jr. et al. | |
| 2013/0282419 A1* | 10/2013 | Braddy | G06Q 10/06 |
| | | | 705/7.15 |
| 2014/0278821 A1 | 9/2014 | McConnell | |
| 2014/0324517 A1 | 10/2014 | Harris | |
| 2015/0169733 A1* | 6/2015 | Motamedi | G06F 3/0482 |
| | | | 707/725 |
| 2015/0242815 A1 | 8/2015 | Velasco | |
| 2016/0042654 A1 | 2/2016 | Fieldman | |

OTHER PUBLICATIONS

Kurjanowicz et al., "Skill Training System," U.S. Appl. No. 15/054,736, filed Feb. 26, 2016, 61 pages.

Final Office Action, dated May 15, 2019, regarding U.S. Appl. No. 15/054,679, 25 pages.

Office Action dated, Jul. 25, 2019, regarding U.S. Appl. No. 15/054,679, 19 pages.

Office Action, dated Oct. 2, 2019, regarding U.S. Appl. No. 15/054,736, 23 pages.

Final Office Action dated Dec. 5, 2019 regarding U.S. Appl. No. 15/054,679, 19 pages.

Final Office Action, dated Mar. 27, 2020, regarding U.S. Appl. No. 15/054,736, 14 pages.

* cited by examiner

ACHIEVEMENT PORTFOLIO SYSTEM

CROSS-REFERENCE TO RELATED APPLICATIONS

This application claims the benefit of U.S. Provisional Patent Application No. 62/240,682, filed Oct. 13, 2015, and entitled "Achievement Portfolio System."

This application is also related to U.S. patent application Ser. No. 15/054,679, entitled "Viral Workstream System", and U.S. patent application Ser. No. 15/054,736, entitled "Skill Training System", each of which is filed even date hereof, assigned to the same assignee, and incorporated herein by reference.

BACKGROUND INFORMATION

1. Field

The present disclosure relates generally to an improved computer system and, in particular, to a method and apparatus for accessing information in a computer system. Still more particularly, the present disclosure relates to a method and apparatus for accessing information about people in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

For example, in filling a position in an organization, requirements for the position are identified as part of the process. The position may be filled from within the organization or by hiring someone from outside of the organization.

As another example, in assigning people to projects, various characteristics about the people may be used to identify who is most suited for different projects. The characteristics may include, for example, skills and experience that may be considered to identify people with the skills needed for a project.

When acquiring a new skill or increasing a proficiency in a skill, employees must often search for relevant information within databases and across various networks. Searching one or more information systems may identify information about a particular skill that aids the employees acquiring for increasing a proficiency in that skill. However, current information systems lack capabilities for employees to share relevant information with regard to particular skills. Furthermore, because employees acquiring new skills often lack a requisite knowledge level, information identified by the employee may not be the best source of information for the skill or even relevant to the particular skill.

Therefore, it would be desirable to have a method and apparatus that take into account at least some of the issues discussed above, as well as other possible issues. For example, it would be desirable to have a method and apparatus that overcome a technical problem of associating content for a particular knowledge, skill, or characteristic, that makes training employees for the knowledge, skill, or characteristic more cumbersome and time-consuming than desired.

SUMMARY

An embodiment of the present disclosure provides a method for training skills in an organization. A computer system identifies activities of an employee. In response to identifying the activities, the computer system identifies achievements of the employee from the activities. Further, the computer system identifies recommended achievements from the achievements based on the application of one or more rules in a policy. Still further, the computer system associates the recommended achievements with an achievement portfolio of the employee, enabling performing an operation for the organization based on the skills for the people in the organization.

Another embodiment of the present disclosure provides a computer system comprising a display system and a portfolio builder in communication with the display system. The portfolio builder identifies activities of an employee. In response to identifying the activities, the portfolio builder identifies achievements of the employee from the activities. Further, the portfolio builder identifies recommended achievements from the achievements based on the application of one or more rules in a policy. Still further, the portfolio builder associates the recommended achievements with an achievement portfolio of the employee, enabling performing an operation for the organization based on the skills for the people in the organization.

Yet another embodiment of the present disclosure provides computer program product for associating achievements into an achievement profile for an employee comprising a computer readable storage media, and first program code, second program code, third program code, and fourth program code stored on the computer readable storage media. The first program code identifies activities of an employee. The second program code, in response to identifying the activities, identifies achievements of the employee from the activities. The third program code identifies recommended achievements from the achievements based on the application of one or more rules in a policy. The fourth program code associates the recommended achievements with an achievement portfolio of the employee, enabling performing an operation for the organization based on the skills for the people in the organization.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an employer may need information about an employee when performing certain operations. The illustrative embodiments also recognize and take into account that searching information systems may be more cumbersome and time-consuming than desirable.

Figure 1:
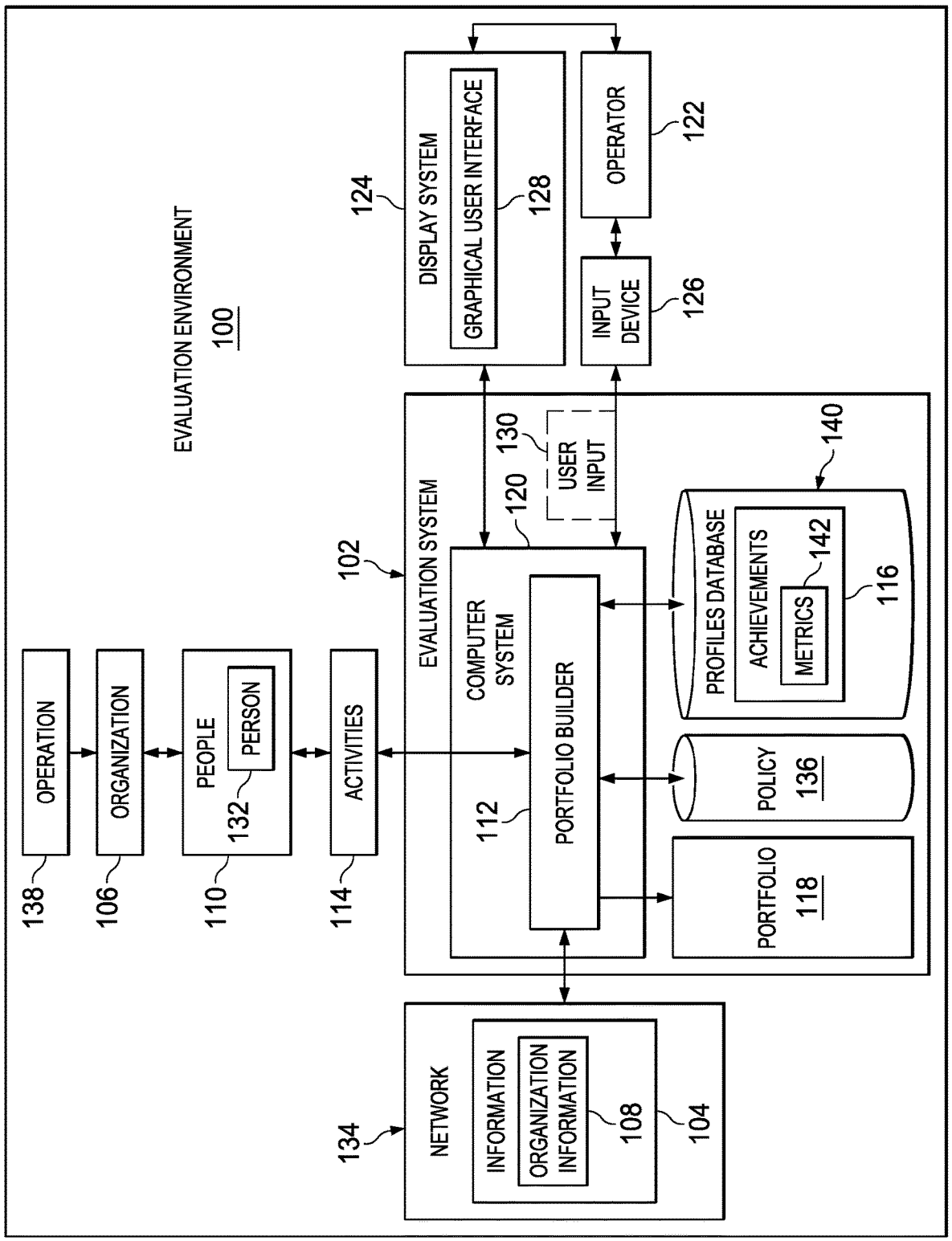
FIG. 1 is an illustration of a block diagram of an employee evaluation environment depicted in accordance with an illustrative embodiment.

As with reference now to the figures and, in particular, reference to FIG. 1, an illustration of a block diagram of an employee evaluation environment is depicted in accordance with an illustrative embodiment. In this illustrative example, the evaluation environment 100 includes evaluation system 102. Evaluation system 102 provides access to information 104 The portion of information 104 that is specifically for organization 106 is organization information 108. The access of information 104 may be at least one of reading, writing, modifying, storing, or deleting information 104.

Information 104 may be information for at least one of people, products, services, business plans, performance reviews, payroll, human resources, benefits administration, business plans, marketing, research, product development, or other suitable information. As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, organization 106 may be, for example, a corporation, a partnership, a charitable organization, a city, a government agency, or some other suitable type of organization. People 110 may be employees of organization 106. In other illustrative examples, people 110 may be members of organization 106 without being employees of organization 106.

Evaluation system 102 provides access to information 104. For example, evaluation system 102 may be used for at least one of payroll, benefits administration, product development, marketing, or other suitable purposes in an organization 106.

In one illustrative example, portfolio builder 112 may be used to perform at least one of identifying activities 114 from information 104, aggregating activities 114 into achievements 116, and presenting achievements 116 in portfolio 118. As depicted, portfolio builder 112 may be implemented in software, hardware, firmware or a combination thereof. When software is used, the operations performed by portfolio builder 112 may be implemented in program code configured to run on hardware, such as a processor unit. When firmware is used, the operations performed by portfolio builder 112 may be implemented in program code and data and stored in persistent memory to run on a processor unit. When hardware is employed, the hardware may include circuits that operate to perform the operations in portfolio builder 112.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, portfolio builder 112 may be implemented in computer system 120. A computer system 120 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, operator 122 may interact with portfolio builder 112 in computer system 120 to access information 104 about activities 114. For example, operator 122 may interact with portfolio builder 112 in evaluation system 102 to identify information 104 that can be used to highlight achievements 116 presented in portfolio 118.

As depicted, operator 122 may interact with portfolio builder 112 using display system 124 and input device 126. Graphical user interface 128 is displayed on display system 124 and provides visualization of information 104 and interaction with portfolio builder 112.

As depicted, display system 124 is a hardware system and includes one or more display devices on which graphical user interface 128 may be displayed. The display devices may include at least one of a light emitting diode display (LED), a liquid crystal display (LCD), an organic light emitting diode display (OLED), or some other suitable device on which graphical user interface 128 can be displayed. The operator 122 may interact with graphical user interface 128 through user input 130 generated by input device 126. Input device 126 may be, for example, a mouse, a keyboard, a trackball, a touchscreen, a stylus, or some other suitable type of input device.

In operation, portfolio builder 112 in computer system 120 provides a method for building portfolio 118 for person 132 of organization 106. As depicted, portfolio 118 is an achievement-centric visual portfolio structure to emphasize achievements 116 of person 132 within a work cycle, while providing guidance for formalized self, peer, and manager evaluations of person 132. Portfolio builder 112 identifies activities 114 for person 132 from information 104 in network 134. Portfolio builder 112 identifies achievements 116 for person 132 by applying policy 136 to activities 114 identified from information 104. Portfolio builder 112 recommends a subset of achievements 116 upon receiving a confirmation from person 132 that the recommended achievements 116 are to be included in portfolio 118, portfolio builder 112 associates the recommended achievements 116 with portfolio 118.

Network 134 is located in at least one of evaluation system 102 or outside of evaluation system 102. For example, network 134 may include at least one of a local area network (LAN), a wide area network (WAN), the Internet, an intranet, or some other suitable type of network.

Portfolio builder 112 identifies activities 114 of person 132 from information 104 in network 134. Activities 114 are information 104 indicative of work performed by a person 132 for the benefit of organization 106. In this illustrative example, activities 114 are selected from at least one of an endorsement, an evaluation, an email message, a published article, a memorandum, a patent, a prototype, research information, a product, program code, presentation materials, computer aided designs, physical models, or other suitable types of activities performed for the benefit of organization 106.

Portfolio builder 112 identifies achievements 116 from activities 114 identified from information 104. Portfolio builder 112 stores achievements 116 in portfolio 118 of achievements 116 for person 132. Achievements 116 are accomplishments of person 132 identified from activities 114. Achievements 116 can be accomplishments of person 132 in performing operation 138 for organization 106. For example, achievements 116 can be the accomplishment of goals or challenges that facilitate operations 138. Additionally, achievement 116 can accomplishments of person 132 that increase the ability of person 132 to facilitate operations 138 performed for organization 106. For example, achievement 116 can be an increase a skill proficiency of person 132, or the mentoring of one or more people 110 by person 132 that increase the ability of people 110 to facilitate operations 138 performed for organization 106.

Portfolio builder 112 recommends achievements 116 to person 132 for inclusion in portfolio 118. As depicted, portfolio builder 112 can recommend achievements 116 for inclusion in portfolio 118 of person 132 according to policy 136.

In this illustrative example, policy 136 is a group of rules. Policy 136 also may include data used to apply the group of rules. As used herein, the "group of," when used with reference to items, means one or more items. For example, a "group of rules" is one or more rules.

As depicted, portfolio builder 112 adds achievements 116 from profiles database 140 to portfolio 118 for person 132 when achievements 116 are identified as recommended. Portfolio builder 112 identifies achievements 116 as recommended when metrics 142 of achievements 116 meets policy 136.

As a result, more certainty is present in performing operation 138 based on the inclusion of achievements 116 for people 110 in portfolio 118 using portfolio builder 112. In other words, portfolio builder 112 may not include achievements 116 identified from information 104 regarding activities 114 of person 132 in portfolio 118, if metrics 142 for achievements 116 do not meet one or more rules of policy 136. In this manner, performing operation 138 for organization 106 is enabled based on portfolio 118 for people 110 in organization 106.

The illustrative example in FIG. 1 and the examples in the other subsequent figures provide one or more technical solutions to overcome a technical problem of assessing activity-based contributions of a particular employee to the achievement of organizational goals, that makes evaluating employees according to their activity-based achievements more cumbersome and time-consuming than desired. For example, portfolio builder 112 identifies and adds achievements 116 to portfolio 118 of person 132 when achievements 116 are aligned with the goals of organization 106. As another example, portfolio builder 112 identifies achievements 116 as being aligned with goals of organization 106 when metrics 142 of achievements 116 meets policy 136 indicating when achievements 116 are recommended for inclusion in portfolio 118.

In this manner, the use of portfolio builder 112 has the technical effect of reducing time, effort, or both in evaluating people 110 based on identifying and recommending achievements 116 for inclusion in portfolio 118. In this manner, operation 138 performed for organization 106 may be performed more efficiently as compared to currently used systems for evaluating people 110. For example, portfolio 118 may be used in operations 138 selected from at least one of hiring, benefits administration, payroll, performance reviews, forming teams for new products, assigning research projects, or other suitable operations for organization 106.

As a result, computer system 120 operates as a special purpose computer system in which portfolio builder 112 in computer system 120 enables building portfolio 118 from achievements 116 identified for people 110. For example, portfolio builder 112 enables building portfolio 118 based on a level of certainty that achievements 116 are in alignment with goals of organization 106 according to policy 136. For example, achievements 116 may be identified as aligned with goals of organization 106, as opposed to relying on an ad hoc self-evaluation of activities 114 by people 110 in determining an evaluation, as well as a possible biased evaluation by person 132 managing and performing evaluations of people 110.

Thus, portfolio builder 112 transforms computer system 120 into a special purpose computer system as compared to currently available general computer systems that do not have portfolio builder 112. Currently used general computer systems do not reduce the time or effort needed to evaluate employees according to achievements 116 based on activities 114 performed for organization 106.

Figure 2:
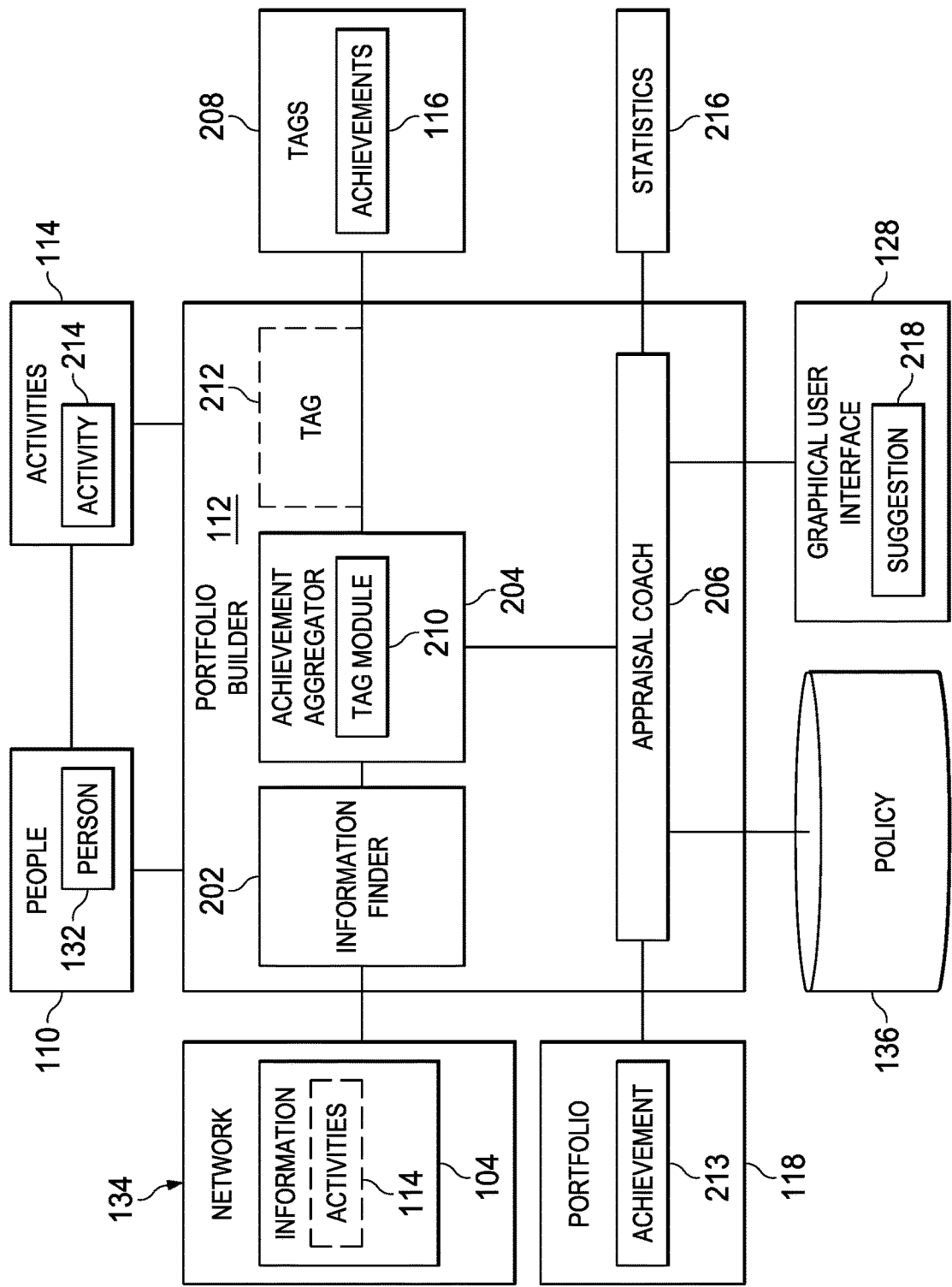
FIG. 2 is an illustration of a block diagram of data flow for building a portfolio from identified employee achievements depicted in accordance with an illustrative embodiment.

With a reference next to FIG. 2, an illustration of a block diagram of data flow for building a portfolio from identified employee achievements is depicted in accordance with an illustrative embodiment. In this figure, an example of data flow for building portfolio 118 according to policy 136 from achievements 116 identified for person 132 through portfolio builder 112 is shown. In the illustrative examples, the same reference numeral may be used in more than one figure. This reuse of a reference numeral in different figures represents the same element in different figures.

As depicted, portfolio builder 112 has a number of different components. As used herein, "a number of items" means one or more items. For example, "a number of different components" means one or more components. As depicted, portfolio builder 112 includes information finder 202, achievement aggregator 204, and appraisal coach 206.

Information finder 202 in portfolio builder 112 searches network 134 for information 104 about activities 114 performed by person 132. In an illustrative example, information finder 202 includes the functionality of at least one of a web crawler, an email analyzer, or other suitable types of tools to search for information 104 about person 132 in network 134.

In another illustrative example, information finder 202 identifies information 104 about activities 114 performed by person 132 by identifying tags 208. In this illustrative example, tags 208 include information specifying that person 132 has performed activities 114 in accomplishing achievements 116. The information in tags 208 also includes at least one of a pointer to activities 114, a pointer to achievements 116 relevant to activities 114, or other suitable types of information for specifying that person 132 has performed activities 114 in accomplishing achievements 116.

As depicted, information finder 202 identifies activities 114 performed by person 132. Activities 114 are information 104 indicative of work performed by a person 132 for the benefit of organization 106. In this illustrative example, activities 114 are selected from at least one of an endorsement, an evaluation, an email message, a published article, a memorandum, a patent, a prototype, research information, a product, program code, presentation materials, computer aided designs, physical models, or other suitable types of activities performed for the benefit of organization 106, shown in block form in FIG. 1.

Achievement aggregator 204 aggregate activities 114 identified by information finder 202 into achievements 116. As depicted, achievements 116 are accomplishments of person 132 identified from activities 114 performed by person 132. Achievements 116 can be accomplishments of person 132 in performing operation 138 for organization 106. For example, achievements 116 can be the accomplishment of goals or challenges that facilitate operations 138. Additionally, achievement 116 can accomplishments of person 132 that increase the ability of person 132 to facilitate operations 138 performed for organization 106. For example, achievement 116 can be an increase a skill proficiency of person 132, or the mentoring of one or more people 110 by person 132 that increase the ability of people 110 to facilitate operations 138 performed for organization 106.

Achievement aggregator 204 in portfolio builder 112 accepts information 104 from information finder 202. Achievement aggregator 204 aggregates and associates information 104 into achievements 116. As depicted, achievement aggregator 204 includes tag module 210. As depicted, tag module 210 creates tag 212 and associates tag 212 with achievement 213.

As depicted, tag module 210 creates tag 212 when tag module 210 receives information 104 about activities 114 from information finder 202. In this illustrative example, tag 212 includes information specifying that person 132 has performed activities 114 in accomplishing achievements 116. The information in tags 208 also includes at least one of a pointer to activity 214, a pointer to achievements 116 relevant to activity 214, or other suitable types of information for specifying that person 132 has performed activity 214 in accomplishing achievements 116.

In this illustrative example, tag module 210 adds tag 212 to tags 208. Adding tag 212 to tags 208 adds achievement 213 to achievements 116 for person 132. Tags 208 are data structures and include information about achievements 116 for people 110. Tags 208 may be stored in at least one of profiles database 140 shown in FIG. 1 or other suitable storage.

As depicted, achievement aggregator 204 calculates statistics 216 about skills achievements 116 of people 110 in organization 106. Statistics 216 are the results of an analysis of achievements 116. In this illustrative example, the analysis is a mathematical analysis that may identify information about achievements 116. The information may include, for example, averages, normal distributions, probabilities, and other information.

For example, when achievements are goals or challenges for person 132, achievement aggregator 204 calculates statistics 216 relating to the scope, volume, visibility, and completion of achievements 116. In this example, the scope of achievements 116 is determined by adding up a number of operations 138 for organization 106 potentially affected by achievements 116. In this example, volume of achievements 116 is determined by adding up a number of achievements 116 for which person 132 has performed activities 214 within the work cycle. In this illustrative example, a completion rate of achievements 116 can be determined by adding up a number of achievements 116 completed by person 132 within the work cycle. Statistics 216 related to the completion rate of achievements 116 may also include an average time for completion, or some other measure of the efficiency of person 132 in performing achievements 116.

In another illustrative example, achievement aggregator 204 calculates statistics 216 for achievements 116 based on a visibility of the achievements within an organization 106. The visibility of achievements 116 can be based on, for example, a number of people 110 with whom achievements 116 are shared throughout organization 106, or a number of people 110 performing activities 114 for achievement 213.

Visibility of achievements 116 can also be calculated based on whether the achievements are trending throughout organization 106. Achievement aggregator 204 calculates trending achievements are calculated by adding up numbers of people 110 that have shared or performed activities 114 for the achievement in achievements 116 over a selected time period. The selected time period is at least one of 30 days, 1 month, 1 day, 1 week, 3 months, 1 year, or some other suitable time period for identifying trends. In an illustrative example, the selected time period can be equal to the work cycle of person 132.

In another illustrative example, when achievements are related to skill proficiency for person 132, achievement aggregator 204 calculates statistics 216 relating to the growth in existing skills, addition of new skills, and mentoring skill proficiency of additional people 110. In an illustrative embodiment, achievement aggregator 204 identifies increases in skill proficiency in new skills for person 132 based on activities 114 performed by person 132 with respect to information 104 relevant to a particular skill. These actions can be, for example but not limited to, at least one of accessing information 104 relevant to increasing proficiency in the particular skill, or providing feedback on information 104 relevant to increasing proficiency in the particular skill.

In an illustrative embodiment, achievement aggregator 204 identifies mentoring skill proficiency of additional people 110 based on activities 114 performed by person 132 with respect to information 104 relevant to the particular skill. These actions can be, for example but not limited to, at least one of submitting information 104 relevant to increasing proficiency in the particular skill, or providing feedback on information 104 relevant to increasing proficiency of people 110 in the particular skill.

Appraisal coach 206 applies a group of rules in policy 136 to achievements 116. Appraisal coach 206 makes suggestion 218 based on the results of applying the group of rules to achievements 116. Suggestion 218 is then displayed within graphical user interface 128.

In an illustrative embodiment, suggestion 218 is a suggestion to add achievements 213 to portfolio 118 based on the results of applying a group of rules to achievement 213. Operator 122, shown in block form in FIG. 1, can interact with suggestion 218 through user input 130, also shown in block form in FIG. 1, to add achievements 213 in suggestion 218 to portfolio 118. In this manner, performing operation 138 for organization 106 is enabled based on portfolio 118 built from achievements 116 of person 132.

As depicted, appraisal coach 206 makes suggestion 218 based on an analysis of achievements 116. In an illustrative example, appraisal coach 206 makes suggestion 218 to include achievement 213 in portfolio 118 person 132 based on policy 136. In this manner, performing operation 138 for organization 106 is enabled based on portfolio 118 built from achievements 116 of person 132.

For example, one rule in policy 136 may makes suggestion 218 to include achievement 213 in portfolio 118 based on statistics 216 relating to a scope of achievement 213. In this manner, performing operation 138 for organization 106 is enabled based on portfolio 118 built from achievements 116 of person 132.

Another rule in policy 136 may make suggestions 218 to include achievement 213 in portfolio 118 based on statistics 216 for a volume of achievements 116. In this manner, performing operation 138 for organization 106 is enabled based on portfolio 118 built from achievements 116 of person 132.

Another rule in policy 136 may make suggestions 218 to include achievement 213 in portfolio 118 based on statistics 216 for a visibility of achievement 213. In this manner, performing operation 138 for organization 106 is enabled based on portfolio 118 built from achievements 116 of person 132.

Another rule in policy 136 may make suggestions 218 to include achievement 213 in portfolio 118 based on statistics 216 for a completion rate of achievements 116. In this manner, performing operation 138 for organization 106 is enabled based on portfolio 118 built from achievements 116 of person 132.

Figure 3:
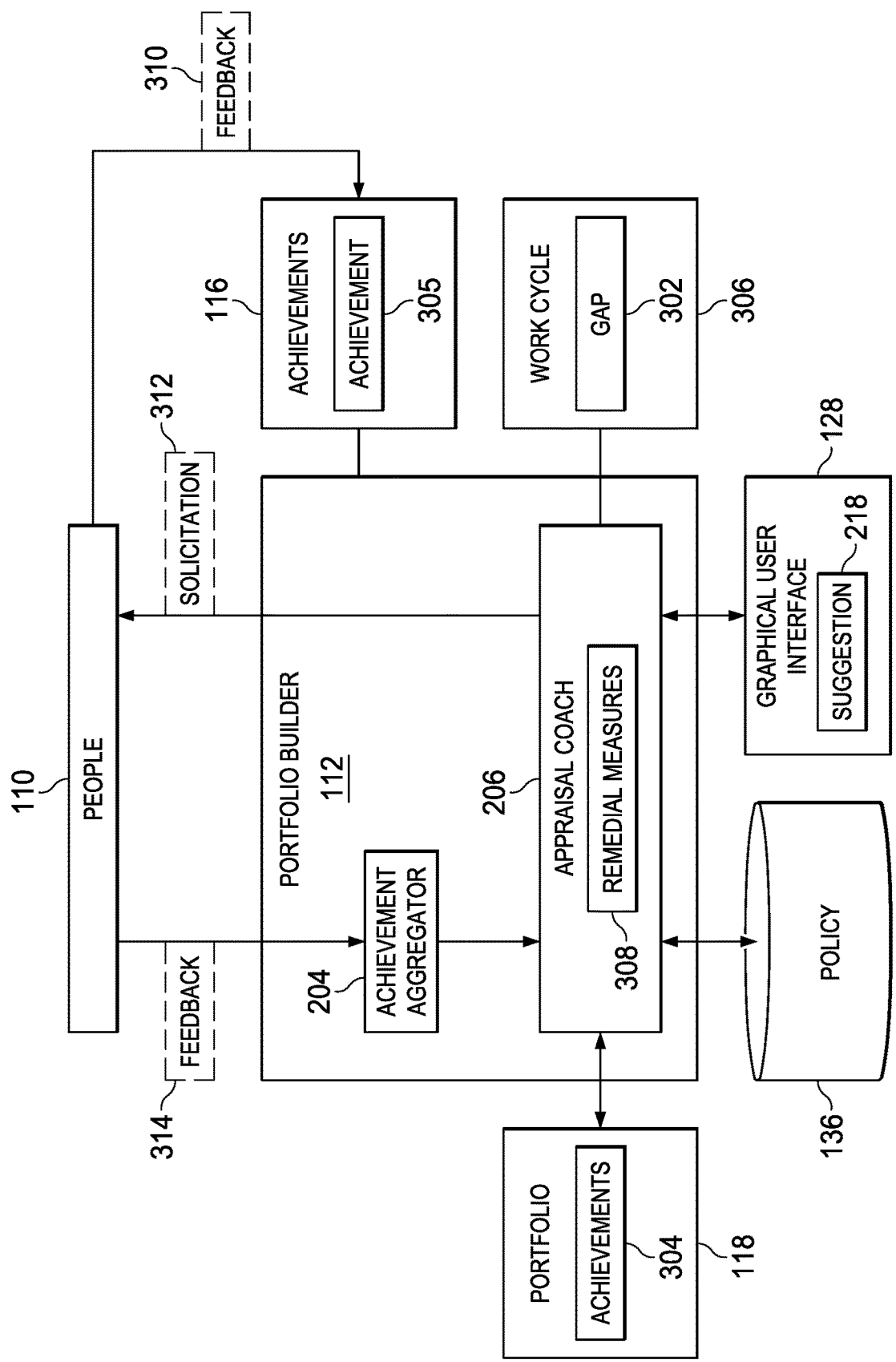
FIG. 3 is an illustration of a block diagram of data flow for identifying and filling activity gaps in a portfolio of identified employee achievement over a work cycle depicted in accordance with an illustrative embodiment.

With reference next to FIG. 3, an illustration of a block diagram of data flow for identifying and filling activity gaps in a portfolio of identified employee achievements over a work cycle is depicted in accordance with an illustrative embodiment. In this figure, an example of a data flow for identifying gap 302 in portfolio 118 of achievements 304 over work cycle 306 according to policy 136 through portfolio builder 112 is shown.

As depicted, portfolio builder 112 has a number of different components. As used herein, "a number of items" means one or more items. For example, "a number of different components" means one or more components. As depicted, portfolio builder 112 includes achievement aggregator 204, and appraisal coach 206.

Appraisal coach 206 analyzes portfolio 118 to identify gap 302. As used he in this illustrative example, gap 302 is a period of inactivity occurring over a selected time period in the chronology of achievements 304 included in portfolio 118. The selected time period can be at least one of 30 days, 1 month, 1 day, 1 week, 3 months, 1 year, or some other suitable time period for a period of inactivity. In an illustrative example, appraisal coach identifies gap 302 in achievements 304 over work cycle 306 based on policy 136.

For example, one rule in policy 136 may identify gap 302 in achievements 304 over work cycle 306 by identifying a period of inactivity in the chronology of achievements 304 included in portfolio 118. In this example, appraisal coach 206 identifies a time period within work cycle 306 corresponding to each of achievement 304 included in portfolio 118. Based on the time periods identified for each of achievement 304, appraisal coach 206 identifies remaining time periods within work cycle 306 not corresponding to achievements 304 as gap 302.

An example, when appraisal coach 206 identifies gap 302, appraisal coach 206 attempts to remediate gap 302 by identifying other achievements 116 to fill the gap 302 in portfolio 118. In this illustrative example, appraisal coach 206 attempts to remediate gap 302 by identifying achievement 305.

In this illustrative example, achievement 305 does not initially meet one or more rules in policy 136 for inclusion in portfolio 118. Therefore, appraisal coach 206 attempts to remediate gap 302 by applying one or more of remedial measures 308 to achievement 305.

For example, one rule in policy 136 may recommend achievements 116 be included in portfolio 118 based on feedback 310 received from people 110 regarding achievements 116. In this illustrative example, appraisal coach 206 identifies people 110 that have previously submitted feedback 310 regarding achievement 305. Appraisal coach 206 sends the solicitation 312 to people 110. Solicitation 312 is a solicitation or request to people 110 to provide additional feedback 314 regarding achievement 305. in this illustrative example, feedback 314 may be additional feedback, or more formal feedback then that provided by feedback 310.

In this illustrative example, feedback 310 and feedback for 314 are activities 114 performed by people 110 with respect to achievement 305. Feedback 310 and feedback 314 may take the form of, for example at least one of company feedback directed to organizational strategy, managerial decisions, and formalized feedback based on surveys and questionnaires. Feedback 310 and feedback 314 may be throughout organization 106, or kept private through the preferences of the giver and receiver of the feedback in question. Feedback 310 and feedback 314 can be given by given by any of people 110, including but not limited to at least one of peers, mentors, managers, and third parties, such as clients, partners, and vendors.

Based on receiving feedback 314, achievement 305 meets policy 136 for inclusion in portfolio 118. Based on achievement 305 meeting policy 136, appraisal coach 206 make suggestion 218 to include achievement 305 in portfolio 118. Achievement 305 is added to achievements 304 when operator 122 confirms suggestion 218 through user input 130, shown in block form in FIG. 1. In this manner, performing operation 138 for organization 106 is enabled based on portfolio 118 built from achievements 116 of person 132.

Figure 4:
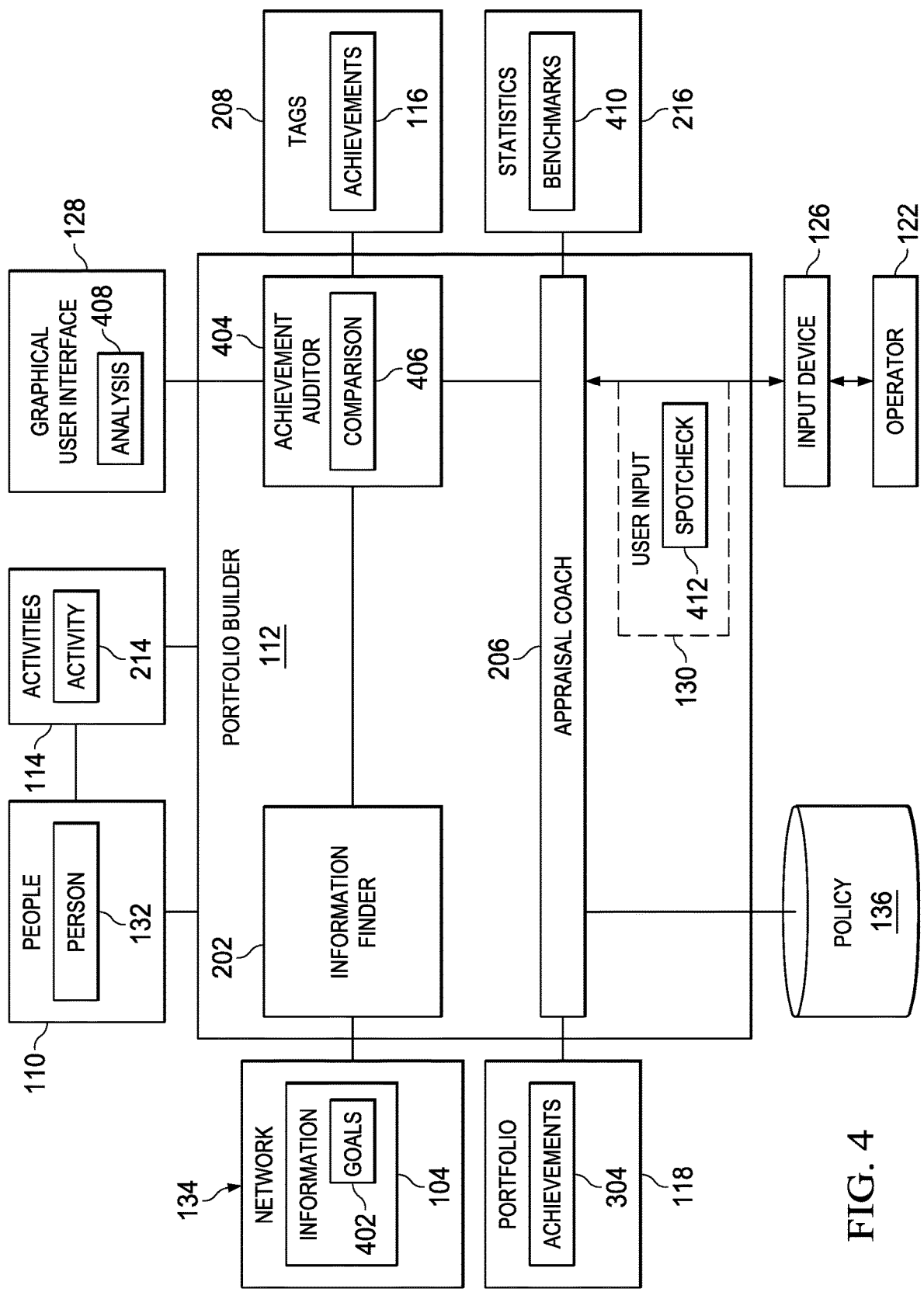
FIG. 4 is an illustration of a block diagram of a data flow for aligning achievements presented in a portfolio with organizational and individual goals within a work cycle depicted in accordance with an illustrative embodiment.

With reference next to FIG. 4, an illustration of a block diagram of data flow for aligning achievements presented in a portfolio with organizational and individual goals within a work cycle is depicted in accordance with an illustrative embodiment. In this figure, an example of a data flow for aligning achievements 304 in portfolio 118 with goals 402 over work cycle 306, shown in block form in FIG. 3, according to policy 136 through portfolio builder 112 is shown.

As depicted, portfolio builder 112 has a number of different components. As depicted, portfolio builder 112 includes information finder 202, appraisal coach 206, and achievement auditor 404.

Achievement auditor 404 in portfolio builder 112 compares achievements 304 in portfolio 118 with goals 402 to form comparison 406. In an illustrative example, achievement auditor compares achievements 304 with goals 402 according to policy 136 to form comparison 406. In an illustrative example, comparison 406 is at least one of an overlap or alignment of achievements 304 with goals 402. As depicted, goals 402 can be at least one of goals of organization 106 and goals of person 132, both shown in block form in FIG. 1. Goals of organization 106 can be goals related to the performance of operation 138. For example, goals 402 of organization 106 can be selected from at least one of market share goals, innovation goals, productivity goals, resources goals, profitability goals, management goals, employees' goals, and social responsibility goals, as well as other suitable goals. Goals 402 of person 132 can be selected from at least one of innovation goals, productivity goals, challenge goals, and skill proficiency goals, as well as other suitable goals.

Achievement auditor 404 applies a group of rules in policy 136 to comparison 406. Achievement auditor 404 initially forms analysis 408 based on the results of applying the group of rules to comparison 406.

For example, one rule in policy 136 may determine whether achievements 116 of person 132 are in alignment with goals 402 for organization 106. In this example, achievement auditor 404 forms comparison 406 based on a comparison of goals 402 of organization 106 to achievements 116 of person 132.

In one example, achievement auditor 404 may form comparison 406 at least in part based on feedback regarding achievements 116 of person 132 received from people 110. The feedback can be, for example feedback 310, shown in block form in FIG. 3.

Another rule in policy 136 may determine whether statistics 216 are indicative of an alignment of achievements 116 of person 132 with goals 402 for organization 106. In this example, achievement auditor 404 may form comparison 406 at least in part based on comparison of statistics 216 for achievements 116 of person 132 to benchmarks 410.

In this example, benchmarks 410 are standards or points of reference against which statistics 216 for achievements 116 may be compared or assessed. In an illustrative example, achievement auditor 404 compare statistics 216 to benchmarks 410 over work cycle 306, shown in block form in FIG. 3, based on policy 136.

In this illustrative example, when statistics 216 meets or exceeds benchmarks 410, achievement auditor 404 determines that person 132 should meet goals 402 over work cycle 306 based on statistics 216 for activities 114. In this example, analysis 408 may simply encourage person 132 to continue performance of activities 114, without substantial changes.

Conversely, when statistics 216 do not meet or exceed benchmarks 410, achievement auditor 404 determines the person 132 will not meet one or more of goals 402 based on statistics 216 of activities 114. In this example, analysis 408 may highlight discrepancies between statistics 216 of activities 114 and benchmarks 410. In response, appraisal coach 206 may suggest one or more of remedial measures 308, shown in block form in FIG. 3, to remediate discrepancies between activities 114 and goals 402. In this example, remedial measures 308 may take the form of suggestions for activities 114 that can more significantly impact the achievement of goals 402.

Another rule in policy 136 may determine whether achievements 116 of person 132 are in alignment with goals 402 for person 132. In this example, achievement auditor 404 form comparison 406 based on a comparison of goals 402 of person 132 to achievements 116 of person 132 for work cycle 306, shown in block form in FIG. 3.

In one example, achievement auditor 404 may form comparison 406 at least in part based on feedback regarding achievements 116 of person 132 received from people 110. The feedback can be, for example feedback 310, shown in block form in FIG. 3.

Another rule in policy 136 may determine whether statistics 216 are indicative of an alignment of achievements 116 of person 132 with goals 402 for person 132. In this example, achievement auditor 404 may form comparison 406 at least in part based on comparison of statistics 216 for achievements 116 of person 132 to benchmarks 410.

Portfolio builder 112 displays analysis 408 within a graphical user interface 128. Analysis 408 enables person 432 to adjust activities 114 to facilitate achievement of goals 402. In this manner, performing operation 138 for organization 106 is enabled based on portfolio 118 built from achievements 116 of person 132.

In an illustrative embodiment, operator 122 can initiate comparison 406 through user input 130 requesting spot check 412. Spot check 412 is user input 130 requesting analysis 408 of comparison 406 comparing achievements 116 two goals 402 within current work cycle 306. In this example, spot check 412 is a real time or near real-time comparison of all activities 114 of person 132 performed within work cycle 306. In this manner, person 132 easily determine whether they are on track to meet goals 402 based on activities 114 performed to-date within work cycle 306.

Figure 5:
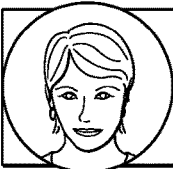
FIG. 5 is an illustration of a block diagram of a graphical user interface for displaying achievements in a portfolio depicted in accordance with an illustrative embodiment.

With reference now to FIG. 5, an illustration of a graphical user interface for displaying achievements in a portfolio is depicted in accordance with an illustrative embodiment. As depicted, graphical user interface 500 is an example of one implementation for graphical user interface 128 shown in block form in FIG. 1.

In this illustrative example, graphical user interface 500 displays a number of different graphical elements. As depicted, graphical user interface 500 includes person 502 and portfolio 504 for person 502. Person 502 is an example of person 132 shown in block form in FIG. 1.

As depicted, graphical user interface 500 displays an image and a name for person 502. For example, graphical user interface 500 may retrieve the image and the name for person 502 from organization information 108 shown in block form in FIG. 1.

Portfolio 504 is an example of portfolio 118, shown in block form in FIG. 1. As depicted, portfolio 504 includes achievement 506, achievement 508, and achievement 510. Each of achievement 506, achievement 508, and achievement 510 is an example of achievements 304, shown in block form in FIG. 3.

In this illustrative example, the achievements in portfolio 504 may be selected through user input 130, shown in block form in FIG. 1. By selecting one of achievement 506, achievement 508, and achievement 510 from portfolio 504, person 502 can access activities 114 and statistics 216, shown in block form in FIG. 2, relevant to that particular achievement. Additionally, by selecting one of achievement 506, achievement 508, or achievement 510, person 502 can request additional feedback, such as feedback 310 shown in block form in FIG. 3. Selection of one of achievements from person portfolio 504 also allows person 502 to control which of achievement 506, achievement 508, and achievement 510 is displayed within portfolio 504.

Figure 6:
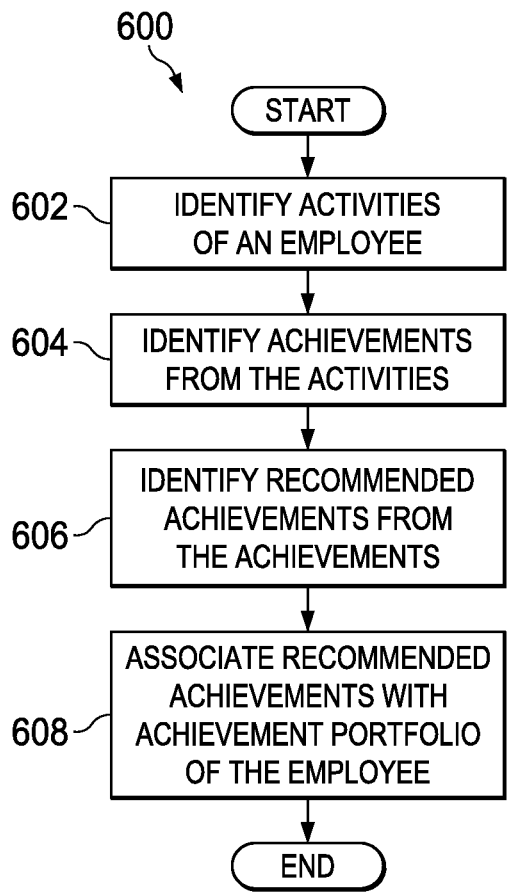
FIG. 6 is an illustration of a flowchart of a process for associating achievement into an achievement portfolio of an employee depicted in accordance with an illustrative embodiment.

Turning next to FIG. 6, an illustration of a flowchart of a process 600 for associating achievements into and achievement profile for an employee is depicted in accordance with an illustrative embodiment. The process 600 illustrated in FIG. 6 may be implemented in evaluation environment 100 shown in block form in FIG. 1. This process 600 may be used to enable operations for organization 106. In particular, the process may be implemented in portfolio builder 112 in computer system 120.

The process 600 begins by identifying activities of an employee (step 602). The activities can be activities 114, shown in block form in FIG. 1. In response to identifying the activities, the process identifies achievements from the activities (step 604). The achievement can be achievements 116, shown in block form in FIG. 1.

The process 600 then identifies recommended achievements from the achievements (step 606). Recommended achievements can be identified based on the application of one or more rules in policy 136, shown in block form in FIG. 1. The process then associates the recommended achievements with an achievement portfolio of the employee (step 608), with the process terminating thereafter. The portfolio can be portfolio 118, shown in block form in FIG. 1. In this manner, performing an action in the organization based on identified activities within an employee portfolio is enabled.

Figure 7:
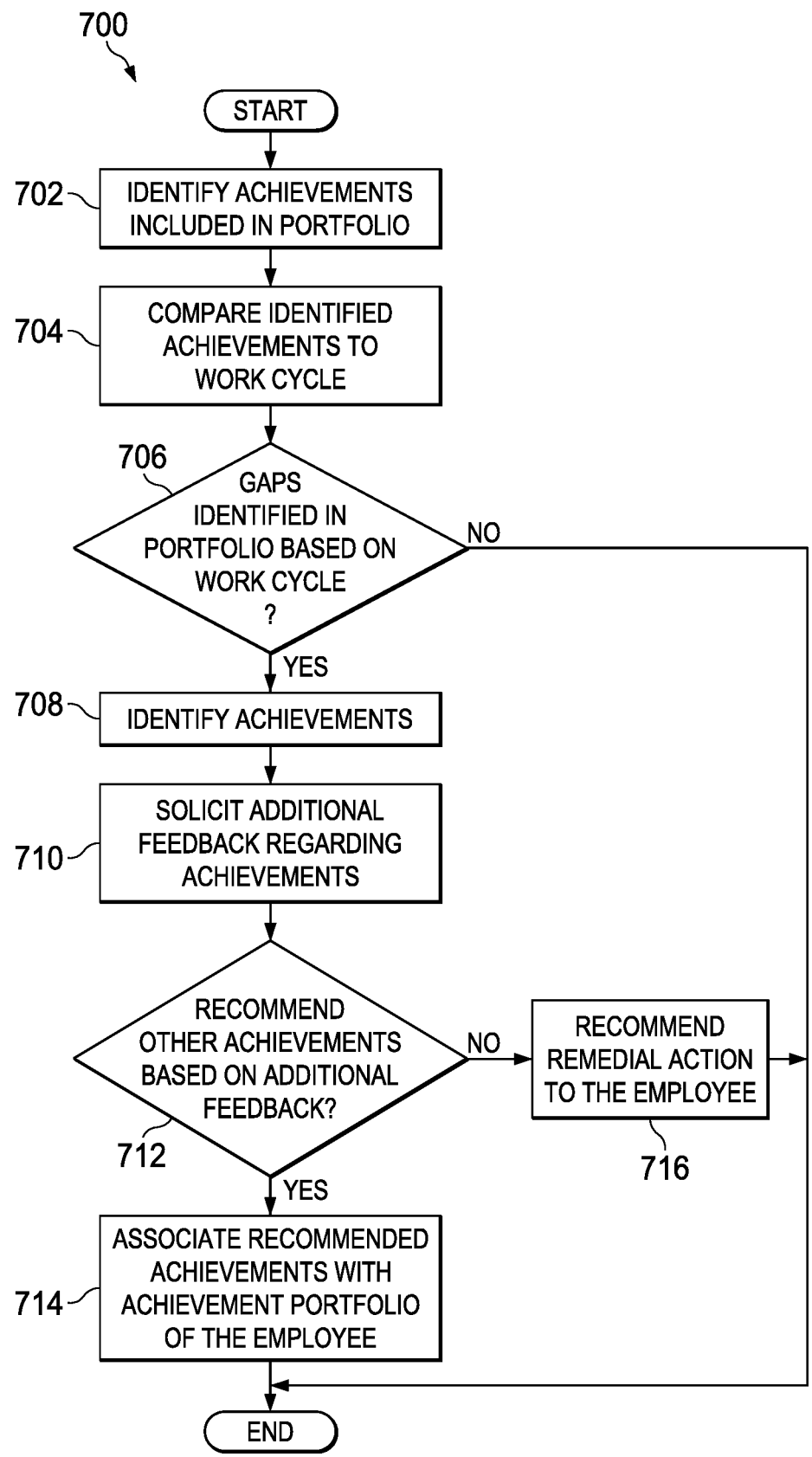
FIG. 7 is an illustration of a flowchart of a process for identifying gaps within achievements in a current work cycle of a portfolio depicted in accordance with an illustrative embodiment.

Turning now to FIG. 7, an illustration of a flowchart of a process 700 for identifying gaps within achievement in a current work cycle of a portfolio is depicted in accordance with an illustrative embodiment. The process 700 illustrated in FIG. 7 may be implemented in evaluation environment 100 shown in block form in FIG. 1. This process may be used to enable operations for organization 106. In particular, the process may be implemented in portfolio builder 112, shown in block form in FIG. 1. Specifically, process 700 may be implemented in appraisal coach 206 of portfolio builder 112, shown in block form in FIG. 2.

The process 700 begins by identifying achievements included in portfolio (step 702). In response to identifying the achievements, the process 700 then compares the identified achievements to a work cycle according to one or more rules for identifying periods of inactivity (step 704). The periods of inactivity can be gap 302, shown in block form in FIG. 3. In response to not identifying gaps in the portfolio based on the work cycle ("no" at step 706), the process 700 terminates.

In response to identifying gaps in the portfolio based on the work cycle ("yes" at step 706), the process 700 identifies additional achievements occurring within the work cycle identified for the employee (step 708). The process then solicits additional feedback regarding the achievements occurring in the identified (step 710). Based on receiving the additional feedback, process 700 can make a recommendation to include identified achievements the portfolio (step 712).

Process 700 makes a recommendation based on the additional feedback activities to meet one or more rules in policy 136. Responsive to recommending that the identified activity be included in the portfolio ("yes" at step 712), the process associates the recommended achievements with the portfolio of the employee (step 714), with the process terminating thereafter. Associating the recommended achievement with portfolio can be in response to receiving confirmation feedback from the employee in response to a suggestion, such as suggestion 218, shown in block form in FIG. 2. Gap 302 is a period of inactivity occurring over a selected time period in the chronology of achievements 304 included in portfolio 118.

Returning now to step 712, responsive to not recommending that the identified activity be included in the portfolio ("no" at step 712), the process recommends additional remedial action to the employee (step 716), with the process terminating thereafter. In this example, the additional remedial action may be a request to the employee to provide additional documentation for activities performed during the gap, such as activities 114, shown in block form in FIG. 1. In this manner, performing an action in the organization based on identified activities within an employee portfolio is enabled.

Figure 8:
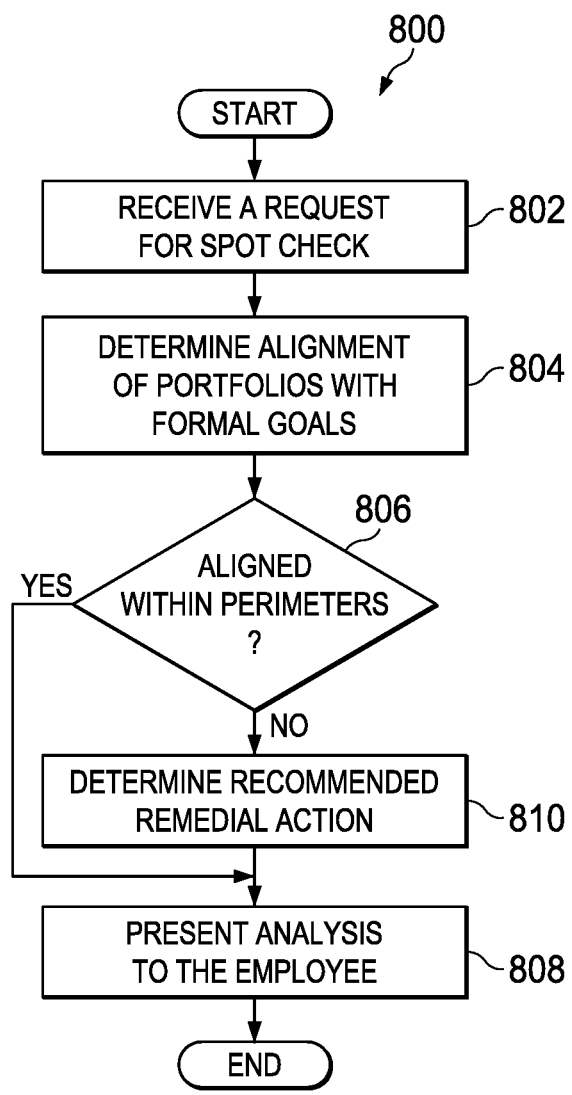
FIG. 8 is an illustration of a flowchart of a process for determining alignment of activities within a portfolio with organizational and personal goals depicted in accordance with an illustrative embodiment.

With reference now to FIG. 8, an illustration of a flowchart of a process 800 for determining alignment of activities within the portfolio with organizational and personal goals is depicted in accordance with an illustrative embodiment. The process 800 illustrated in FIG. 8 may be implemented in evaluation environment 100 shown in block form in FIG. 1. This process 800 may be used to enable operations for organization 106. In particular, the process 800 may be implemented in portfolio builder 112 in computer system 120. Specifically, the process 800 may be implemented in achievement auditor 404, shown in block form in FIG. 4.

The process 800 begins by receiving a request for a spot check (step 802). The process then determines alignment of activities within an employee portfolio with at least one of organizational goals or personal goals (step 804).

Responsive to determining that the activities in the portfolio are aligned with organizational personal goals ("yes" at step 806), the process 800 presents an analysis of the comparison to the employee (step 808), with the process terminating thereafter.

Returning to step 806, responsive to determining that the activities are not in alignment with organizational or personal goals ("no" at step 806), the process 800 determines remedial action selected to bring the activities the activities into alignment with goals (step 810). The process 800 then continues to step 808, presenting the analysis to the employee with the process terminating thereafter. In this manner, performing an action in the organization based on identified activities within an employee portfolio is enabled.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
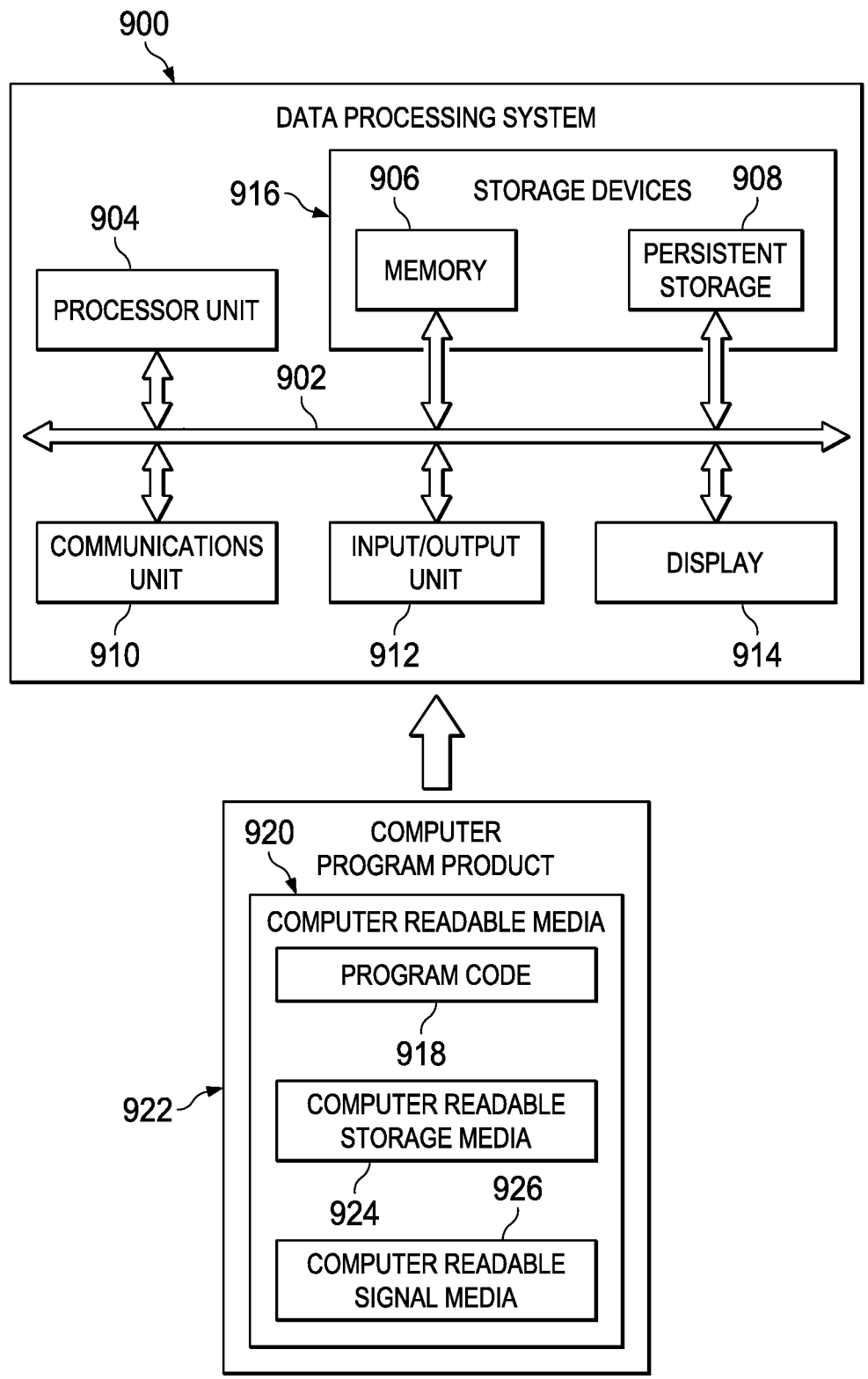
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 120 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918. Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, the illustrative examples in the different figures provide one or more technical solutions to overcome a technical problem of assessing activity-based contributions of a particular employee to the achievement of organizational goals, that makes evaluating employees according to their activity-based achievements more cumbersome and time-consuming than desired. A portfolio builder identifies activities of an employee. In response to identifying the activities, the portfolio builder identifies achievements of the employee from the activities. The portfolio builder identifies recommended achievements from the achievements based on the application of one or more rules in a policy. Further, the portfolio builder associates the recommended achievements with an achievement portfolio of the employee.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for associating achievements into an achievement profile for an employee, the method comprising:
    identifying, by a computer system, activities indicative of work performed by an employee, wherein the activities are identified from information for an organization, wherein the activities include at least one of an email message by the employee, a published article by the employee, a memorandum by the employee, a patent by the employee, a prototype by the employee, research information by the employee, a product by the employee, a program code by the employee, a presentation material by the employee, a computer aided design by the employee, and a physical model by the employee;
    in response to identifying the activities, identifying, by the computer system, a subset of the activities of the employee that are tagged as achievements of the employee that contribute to goals of the organization, wherein the achievements are identified from tags associated with the activities of the employee;
    calculating, by the computer system, statistics for the achievements of the employee, wherein the statistics include at least one of statistics relating to a scope of the achievements, statistics relating to a volume of the achievements, statistics relating to a visibility of the achievements, and statistics relating to a completion of the achievements;
    identifying, by the computer system, recommended achievements from the achievements based on feedback received from other employees regarding the achievements of the employee and a comparison of the statistics for the achievements of the employee to benchmarks for the achievements;
    aggregating, by the computer system, the recommended achievements into an achievement portfolio of the employee; and
    performing an operation for the organization, wherein the operation is enabled based on the achievement portfolio of the employee.

2. The method of claim 1, wherein the achievements include accomplishments of activities by the employee in performing an operation for an organization, wherein the accomplishments comprise at least one of increasing a skill proficiency of the employee, and mentoring another employee of the organization, wherein identifying the achievement further comprises:
    identifying information accessed by the employee, wherein the accessed information is tagged as relevant to increasing the skill proficiency;
    identifying information submitted by the employee, wherein the submitted information is tagged as relevant to increasing the skill proficiency; and
    identifying feedback provided by the employee, wherein the feedback is provided regarding information that is tagged as relevant to increasing the skill proficiency.

3. The method of claim 1, wherein the visibility of the achievement is based on at least one of a number of people within an organization with whom the achievement is shared, a number of people within the organization performing activities for the achievement, and whether the achievement is trending within the organization.

4. The method of claim 1, further comprising:
    in response to identifying the recommended achievements from the achievements, suggesting the recommended achievements for inclusion in the achievement portfolio of the employee, wherein the suggestion is made by displaying the recommended achievements within a graphical display interface.

5. The method of claim 1, further comprising:
    identifying a period of inactivity occurring over a selected time period in a chronology of the recommended achievements included in the achievement portfolio of the employees; and
    in response to identifying the period of inactivity, soliciting feedback regarding the activities of the employee that were not associated with the achievements of the employee and occurred within the period of inactivity.

6. The method of claim 5, further comprising:
    responsive to receiving feedback regarding the activities occurring within the period of inactivity, identifying an additional recommended achievement based on the activities occurring within the period of inactivity; and
    associating the additional recommended achievement with the achievement portfolio of the employee.

7. A computer system comprising:
    a portfolio builder for associating achievements into an achievement profile for an employee, the portfolio builder being configured:
        to identify activities indicative of work performed by an employee, wherein the activities are identified from information for an organization, wherein the activities include at least one of an email message by the employee, a published article by the employee, a memorandum by the employee, a patent by the employee, a prototype by the employee, research information by the employee, a product by the employee, a program code by the employee, a presentation material by the employee, a computer aided design by the employee, and a physical model by the employee;

in response to identifying the activities, to identify a subset of the activities of the employee that are tagged as achievements of the employee that contribute to goals of the organization, wherein the achievements are identified from tags associated with the activities of the employee;

to calculate statistics for the achievements of the employee, wherein the statistics include at least one of statistics relating to a scope of the achievements, statistics relating to a volume of the achievements, statistics relating to a visibility of the achievements, and statistics relating to a completion of the achievements;

to identify recommended achievements from the achievements based on feedback received from other employees regarding the achievements of the employee and a comparison of the statistics for the achievements of the employee to benchmarks for the achievements; and to aggregate the recommended achievements into an achievement portfolio of the employee.

8. The computer system of claim 7, wherein the achievements include accomplishments of activities by the employee in performing an operation for an organization, wherein the accomplishments comprise increasing a skill proficiency of the employee, and mentoring another employee of the organization, wherein in identifying the achievement, the portfolio builder is further configured:

to identify information accessed by the employee, wherein the accessed information is tagged as relevant to increasing the skill proficiency;

to identify information submitted by the employee, wherein the submitted information is tagged as relevant to increasing the skill proficiency; and to identify feedback provided by the employee, wherein the feedback is provided regarding information that is tagged as relevant to increasing the skill proficiency.

9. The computer system of claim 7, wherein the visibility of the achievement is based on at least one of a number of people within an organization with whom the achievement is shared, a number of people within the organization performing activities for the achievement, and whether the achievement is trending within the organization.

10. The computer system of claim 7, wherein the portfolio builder is further configured:

in response to identifying the recommended achievements from the achievements, to suggest the recommended achievements for inclusion in the achievement portfolio of the employee, wherein the suggestion is made by displaying the recommended achievements within a graphical display interface.

11. The computer system of claim 7, wherein the portfolio builder is further configured:

to identify a period of inactivity occurring over a selected time period in a chronology of the recommended achievements included in the achievement portfolio of the employees; and in response to identifying the period of inactivity, to solicit feedback regarding the activities of the employee that were not associated with the achievements of the employee and occurred within the period of inactivity.

12. The computer system of claim 11, wherein the portfolio builder is further configured:

responsive to receiving feedback regarding the activities occurring within the period of inactivity, to identify an additional recommended achievement based on the activities occurring within the period of inactivity; and to associate the additional recommended achievement with the achievement portfolio of the employee.

13. A computer program product for associating achievements into an achievement profile for an employee, the computer program product comprising:

a computer readable storage media;

first program code, stored on the computer readable storage media, for identifying activities indicative of work performed by an employee, wherein the activities are identified from information for an organization, wherein the activities include at least one of an email message by the employee, a published article by the employee, a memorandum by the employee, a patent by the employee, a prototype by the employee, research information by the employee, a product by the employee, a program code by the employee, a presentation material by the employee, a computer aided design by the employee, and a physical model by the employee;

second program code, stored on the computer readable storage media, for identifying a subset of the activities of the employee that are tagged as achievements of the employee that contribute to goals of the organization, wherein the achievements are identified from tags associated with the activities of the employee;

third program code, stored on the computer readable storage media, for calculating statistics for the achievements of the employee, wherein the statistics include at least one of statistics relating to a scope of the achievements, statistics relating to a volume of the achievements, statistics relating to a visibility of the achievements, and statistics relating to a completion of the achievements fourth program code, stored on the computer readable storage media, for identifying recommended achievements from the achievements based on feedback received from other employees regarding the achievements of the employee and a comparison of the statistics for the achievements of the employee to benchmarks for the achievements; and fifth program code, stored on the computer readable storage media, for aggregating the recommended achievements into an achievement portfolio of the employee.

14. The computer program product of claim 13, wherein the achievements include accomplishments of activities by the employee in performing an operation for an organization, wherein the accomplishments comprise at least one of increasing a skill proficiency of the employee, and mentoring another employee of the organization, wherein the second program code for identifying the achievement further comprises:

program code for identifying information accessed by the employee, wherein the accessed information is tagged as relevant to increasing the skill proficiency;

program code for identifying information submitted by the employee, wherein the submitted information is tagged as relevant to increasing the skill proficiency; and program code for identifying feedback provided by the employee, wherein the feedback is provided regarding information that is tagged as relevant to increasing the skill proficiency.

15. The computer program product of claim 13, wherein the visibility of the achievement is based on at least one of a number of people within an organization with whom the achievement is shared, a number of people within the organization performing activities for the achievement, and whether the achievement is trending within the organization.

16. The computer program product of claim 13, further comprising:
sixth program code, stored on the computer readable storage media, for suggesting the recommended achievements for inclusion in the achievement portfolio of the employee in response to identifying the recommended achievements from the achievements, wherein the suggestion is made by displaying the recommended achievements within a graphical display interface.

17. The computer program product of claim 13, further comprising:
sixth program code, stored on the computer readable storage media, for identifying a period of inactivity occurring over a selected time period in a chronology of the recommended achievements included in the achievement portfolio of the employees; and
seventh program code, stored on the computer readable storage media, for soliciting feedback regarding the activities of the employee that were not associated with the achievements of the employee and occurred within the period of inactivity.

18. The computer program product of claim 17, further comprising:
eighth program code, stored on the computer readable storage media, for identifying an additional recommended achievement based on the activities occurring within the period of inactivity in response to receiving feedback regarding the activities occurring within the period of inactivity; and
the program code, stored on the computer readable storage media, for associating the additional recommended achievement with the achievement portfolio of the employee.

* * * * *